United States Patent [19]

Lee et al.

[11] Patent Number: 5,790,557
[45] Date of Patent: Aug. 4, 1998

[54] APPARATUS FOR IMPLEMENTING THE FUNCTION OF A VIRTUAL CONTAINER-11 AND A TRIBUTARY UNIT GROUP-2 IN A SYNCHRONOUS DIGITAL HIERARCHY

[75] Inventors: Haeng-Woo Lee; Hee-Cheon Shin; Soon-Il Yeo; Sung-Mo Park; Myung-Shin Kwak, all of Daejeon, Rep. of Korea

[73] Assignees: Electronics and Telecommunications Research Institute, Daejon; Korea Telecommunication Authority, Seoul, both of Rep. of Korea

[21] Appl. No.: 712,665

[22] Filed: Sep. 13, 1996

[51] Int. Cl.$^6$ ............................................. H04J 3/06
[52] U.S. Cl. ............................................. 370/535; 370/503
[58] Field of Search ........................... 370/535, 536, 370/537, 538, 539, 540, 541, 542, 543, 544, 545, 546, 503, 512, 509, 510, 508, 350, 507, 517, 518, 519; 375/354, 355, 356, 359, 361

[56] References Cited

U.S. PATENT DOCUMENTS 5,040,170  8/1991  Upp et al. ..................... 370/358
5,343,461  8/1994  Barton et al. ................... 370/249

OTHER PUBLICATIONS

The paper entitled "Network synchronization–A challenge for SDH/SONET?" by Michael J. Klein and Ralph Urbansky, Sep. 1993, pp. 42–50.

*Primary Examiner*—Dang Ton
*Attorney, Agent, or Firm*—Antonelli, Terry, Stout & Kraus, LLP

[57] ABSTRACT

An apparatus for implementing the integrated function of virtual container-11(VC-11) and tributary unit group-2 (TUG-2) is configured to transmit and receive a DS-1 network signal and a TUG-2 system signal through a synchronization process in a synchronous multiplexing structure. Data between a network and a system is converted by using only one Tx buffer and one receiving buffer in a transmitter and a receiver respectively. An input of a Tx FIFO buffer is a DS-1 signal of 1.544 Mbps, and an output thereof is a TU-11 frame of 1.728 Mbps including spaces for a path overhead and a pointer. An input of a RX FIFO buffer is the TU-11 signal of 1.728 Mbps in which the path overhead and the pointer are eliminated, and an output thereof is the DS-1 signal of 1.544 Mbps.

6 Claims, 5 Drawing Sheets

5,790,557

APPARATUS FOR IMPLEMENTING THE FUNCTION OF A VIRTUAL CONTAINER-11 AND A TRIBUTARY UNIT GROUP-2 IN A SYNCHRONOUS DIGITAL HIERARCHY

BACKGROUND OF THE INVENTION

1. Field of the Invention

The present invention relates to an apparatus for implementing the integrated function of VC-11 (Virtual Container-11) and TUG-2 (Tributary Unit Group-2) in a synchronous multiplexing structure accommodating the ITU-T recommendation for a synchronous digital hierarchy and, more particularly, to an apparatus for simplifying a circuit and reducing the area of a chip by using one transmitting data buffer and one receiving data buffer in a transmitter and a receiver, respectively.

2. Discussion of Related Art

A synchronous digital hierarchy (SDH) is a hierarchical digital transmission structure which is standardized so as to multiplex and process payload signals of various hierarchies and to transmit the multiplexed and processed signals through a communication network. A synchronous multiplexing structure provides various advantages such as simplifying multiplexing and demultiplexing simplifying an access to a low speed hierarchical signal, improving operation and maintenance function, and in the future, facilitating an extension to the broadband communication. The ITU-T has published G.707, G.708, G709, G781, G783, G784, etc as the recommendation for such a SDH.

A SDH system is based on a SONET (Synchronous Optical NETwork) system of U.S. Currently, STM-1 in the 155.520 Mbps, STM-4 of 622.080 Mbps, STM-16 of 2.488320 Gbps, etc. are adopted as standards by the ITU-T. Each hierarchical signal of North America and Europe is multiplexed and transmitted in this system.

A VC-11 circuit converts the digital signal DS-1 signal of the North American Standard to VC-11 data format. A TUG-2 circuit multiplexes the VC-11 data by a factor of 4 and transmits the multiplexed data to an upper hierarchy. In this case, since a FIFO (First-In First-Out) buffer is generally used at two points in which a path overhead byte is inserted to construct VC-11 data and a pointer byte is inserted to construct TU-11 (Tributary Unit-11)data, transmitter and receiver circuits are complicated, and the area of the chip increases.

A structure to synchronize the network in the SDH system is described in a paper entitled "Network Synchronization - A Challenge for SDH/SONET ?", IEEE Commun. Mag., vol. 31, no. 9, Sep. 1993, pp. 42–50, Michael J. Klein & Ralph Urbansky. This structure is proposed to synchronize the network between TU and TUG in the SDH system. However, this structure is uneconomical in that two elastic buffers are used and other additional circuits should be added.

Another structure for the network synchronization in the SDH system for multiplexing European digital transmission data is disclosed in European Patent No. EP 0 503 732 A2, "Ubertragungs system fur die digital Synchron-Hierarchie", Philips. The above patent using only one buffer memory describes a synchronous structure when a DS-nE signal of a European transmission speed is multiplexed to the SDH system.

SUMMARY OF THE INVENTION

An object of the present invention is to provide an apparatus for implementing the integrated function of VC-11 and TUG-2 in a synchronous multiplexing structure which can simplify a circuit and reduce the area of a chip.

Another object of the present invention is to provide an apparatus for synchronizing DS-1 and TU-11 when multiplexing a DS-1 signal of an American Standard transmission speed to a TUG-2 signal of an SDH system.

To achieve these and other advantages and in accordance with the purpose of the present invention, as embodied and broadly described, the apparatus for implementing the integrated function of VC-11 and TUG-2 in a synchronous multiplexing structure for synchronizing a DS-1 network signal and a TUG-2 system signal and transmitting the synchronized signal includes: a B8ZS decoder for decoding a DS-1 network TX signal of 1.544 Mbps coded to a B8ZS code to network data; a TX signal write clock generator for generating a write clock used for writing the network data decoded from the decoder; a TX signal read clock generator for generating a read clock used for reading the network data stored in TX FIFO; TX FIFO a buffer for writing the DS-1 network data decoded from the decoder in synchronization with the read clock, and for generating the DS-1 network data of a TU-11 frame structure of 1.728 Mbps including spaces for a path overhead and a pointer in synchronization with the write clock; a bit stuffing controller for generating a control signal for constantly maintaining a difference between the write and read clocks of the TX FIFO buffer; a pointer generator for generating 1-byte data by adjusting a pointer value by a pointer adjusting signal when the difference between the read and write clocks is one byte; an overhead generator for generating an overhead for a lower hierarchy path; a frame former for receiving the DS-1 network data generated from the TX FIFO buffer, the overhead generated from the overhead generator and the pointer value generated from the pointer generator, and for forming TU-11 frame data; a TX clock generator for receiving a transmitting clock of 6.912 MHz, for transmitting a clock needed to read data to the TX signal read clock generator, and for generating a frame transmitting clock of 2 KHZ; and a TUG-2 multiplexer for multiplexing the TU-11 frame data formed from the TU-11 frame former and from three external TU-11 frame formers, and for transmitting the multiplexed data with a speed of 6.912 Mbps.

Further, the apparatus for implementing the integrated function of VC-11 and TUG-2 in a synchronous multiplexing structure for synchronizing a network signal of DS-1 and a system signal of TUG-2 and for receiving the synchronized signal includes: a loopback controller for receiving, at a normal mode, RX data of 6.912 MHz, and for receiving, at a test mode, TX data through feedback to confirm whether the TX and RX data are equal; a TUG-2 demultiplexer for demultiplexing multiplexed TUG-2 system frame data received through the loopback controller to four independent data; four TU-11 frame deformers for deforming each frame of four demultiplexed data, and for extracting a path overhead, a pointer value, and a TU-11 signal in which the path overhead and the pointer value are eliminated; a path overhead processor for interpreting the path overhead extracted from one of the TU-11 frame deformers, and for implementing a unique function; a pointer processor for interpreting the pointer value extracted from one of the TU-11 frame deformers, and for generating a control signal according to the state of the pointer value; an RX clock generator for generating various clocks necessary for operation of a receiver by using an RX clock of 6.912 MHz and a receiving frame clock of 2 KHz applied from the exterior; an RX data write clock generator for receiving the clock generated from the RX clock generator, and for generating a write clock used for writing TU-11 system data of 1.728 Mbps in which the path overhead and the pointer are eliminated according to control signals of the overhead processor and the pointer processor; an RX data read clock generator for generating a read clock used for reading data from a clock obtained by dividing a bit leaked clock by a factor of four; a clock comparator for comparing the write clock with the read clock to constantly maintain a clock difference, and for generating a bit leaking request signal when there is a clock difference; a bit leaking processor for bit leaking a 6.912 MHz input clock by the bit leaking request signal generated from the clock comparator, and for dividing the bit leaked clock by a factor of four; RX FIFO buffer for storing the TU-11 data in which the path overhead and the pointer are eliminated in synchronization with the write clock, and for converting the stored TU-11 data to DS-1 data in synchronization with the read clock; and a B8ZS coder for coding the DS-1 data generated from the RX FIFO buffer to a B8ZS code, and for transmitting the DS-1 signal with a speed of 1.544 Mbps.

The write clock and the read clock may vary according to the capacity of the transmitting and receiving buffers.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are integrated in and constitute a part of this specification, illustrate embodiments of the invention and together with the description serve to explain the principles of the invention. In the drawings.

DETAILED DESCRIPTION OF PREFERRED EMBODIMENT

Reference will now be made in detail to the preferred embodiments of the present invention, examples of which are illustrated in the accompanying drawings.

Figure 5:
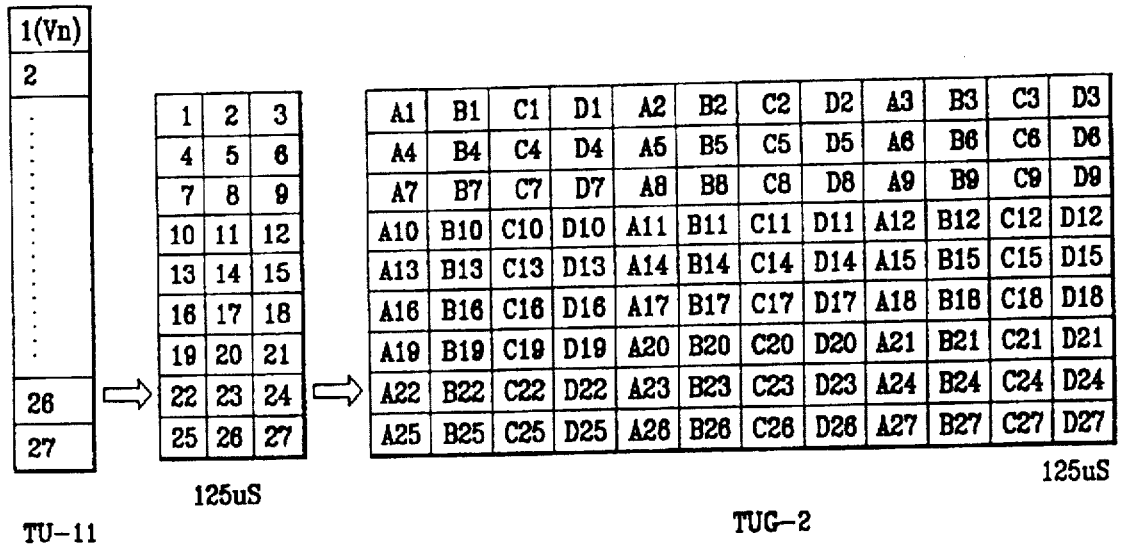
FIG. 5 illustrates multiplexing a TU-11 signal to a TUG-2 signal.

An apparatus according to the present invention constructs a TUG-2 frame by multiplexing 1.544 Mbps data which is a DS-1 signal on the basis of the ITU-T recommendation for a SDH. By using only one transmitting buffer and one receiving buffer in a transmitter and a receiver respectively, a difference in construction and speed of data between a network signal of DS-1 and a system signal of TUG-2 is converted. A TUG-2 signal of 6.912 Mbps has 108 bytes per frame of 125 us as indicated in FIG. 5 and shows a structure multiplexed to A, B, C and D by interleaving a TU-11 signal of 27 bytes.

Figure 1:
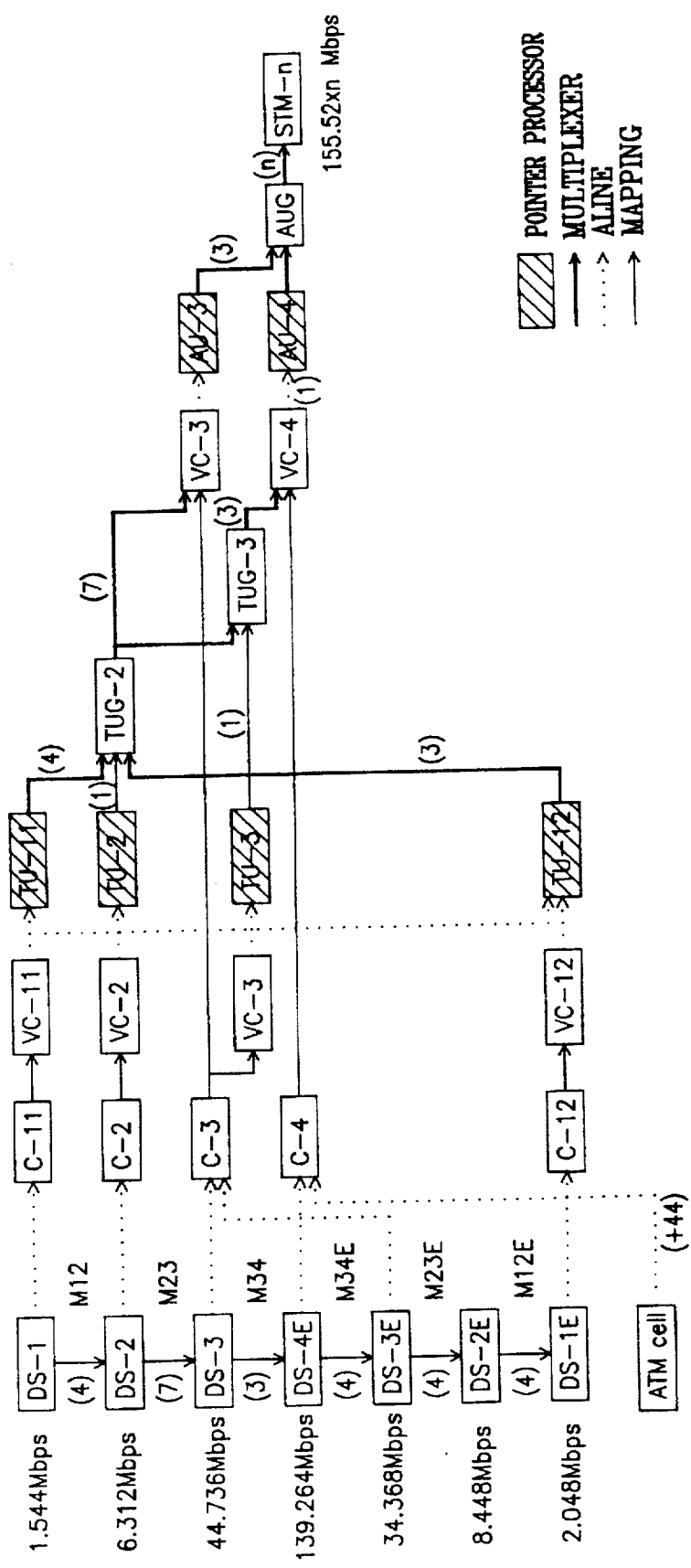
FIG. 1 illustrates a synchronous multiplexing structure.

FIG. 1 shows a synchronous multiplexing structure, and the apparatus for implementing the integrated function of VC-11 and TUG-2 is connected thereto. A VC-11 circuit converts a DS-1 signal of a North American Standard to VC-11 data shown in FIG. 3. A TUG-2 circuit multiplexes the VC-11 data to 4:1 and transmits the multiplexed data to an upper layer from a lower layer.

The construction and operation of the apparatus according to the present invention will now be described with reference to FIGS. 2 to 7.

Figure 2:
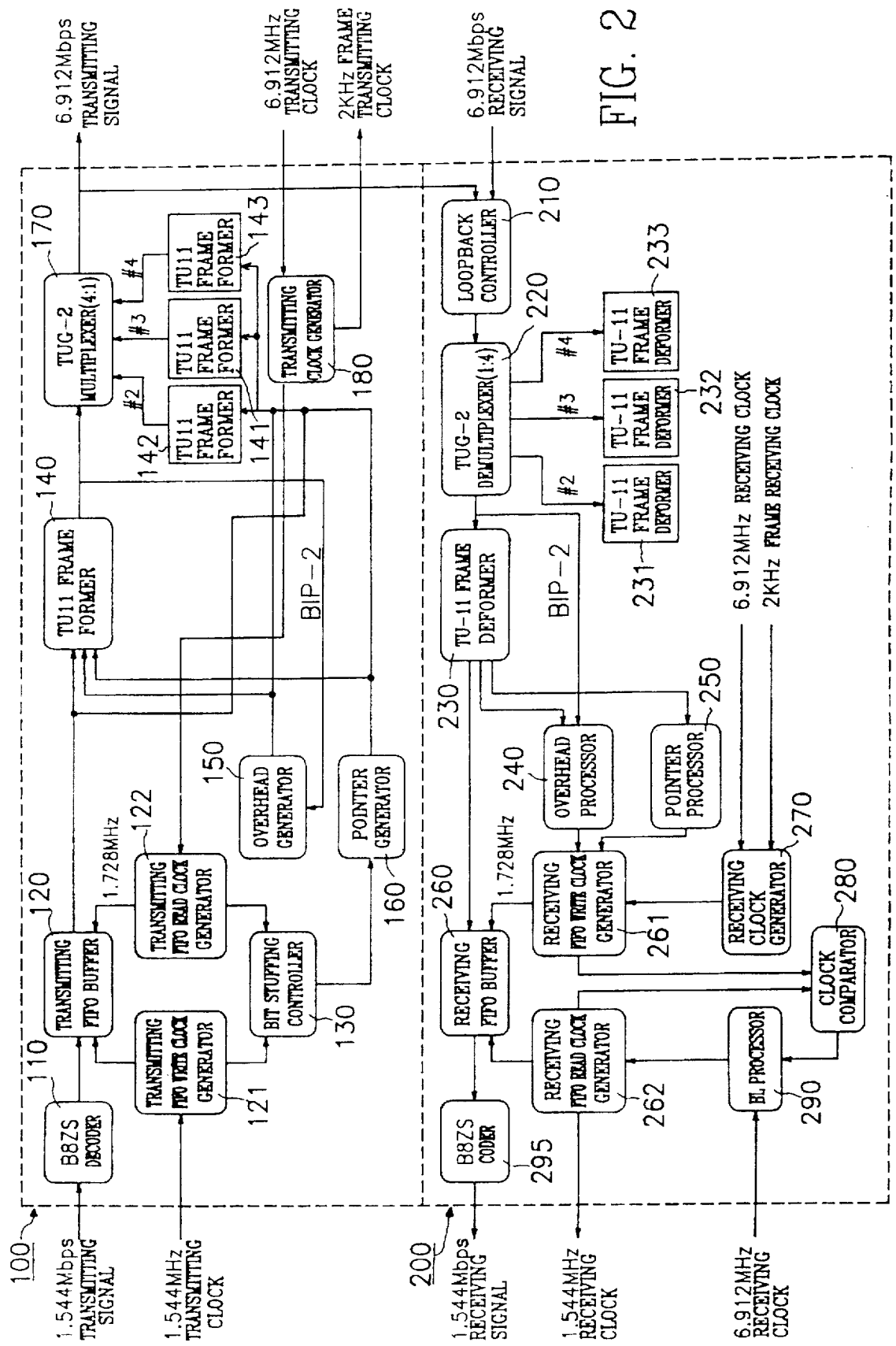
FIG. 2 is a block diagram of VC-11 and TUG-2 according to the present invention.

Referring to FIG. 2, the apparatus for implementing the integrated function of VC-11 and TUG-2 includes a transmitter 100 for converting a DS-1 network signal into a TUG-2 system signal by use of one TX FIFO buffer 120, and a receiver 200 for converting the TUG-2 system signal transmitted from the transmitter 100 to the DS-1 network signal by use of one RX FIFO buffer 260.

The transmitter 100 receives the DS-1 network TX signal of 1.544 Mbps and generates a TU-11 frame of 1.728 Mbps including spaces for a path overhead and a pointer by use of the TX FIFO buffer 120. The receiver 200 receives the TU-11 system signal of 1.728 Mbps in which the path overhead and the pointer are eliminated and generates the DS-1 network signal of 1.544 Mbps by use of the RX FIFO buffer 260. A bit leaking (BL) processor 290 of the receiver 200 adjusts a clock difference between a network and a system. A clock comparator 280 compares a write clock with a read clock. If the clock comparator 280 generates a control signal for the clock difference, the BL processor 290 implements bit leaking for a 6.912 MHz clock received from a DS-1 network and divides the bit leaked clock by a factor of four to be used as an RX FIFO read clock.

An input signal from a subscriber is 1.544 Mbps data coded to a B8ZS code and corresponds to the DS-1 network signal.

A B8ZS decoder 110 decodes a B8ZS input signal to a binary bit. During decoding, the B8ZS decoder 110 checks whether or not a code rule is violated. The TX FIFO buffer 120 writes input data by a TX FIFO write clock of 1.544 MHz synchronized with the B8ZS input signal, and reads data by an output clock of a transmitting clock generator 180 synchronized with a multiplexer, i.e., by a TX FIFO read clock of 1.728 MHz. The TX FIFO write clock is generated from a TX FIFO write clock generator 121 receiving a transmitting clock of 1.544 MHz from the DS-1 network. The TX FIFO read clock is generated from a TX FIFO read clock generator 122 using 1.728 MHz generated from the transmitting clock generator 180. The output data of the TX FIFO buffer 120 includes DS-1 data and has a perfect frame structure with spaces which can insert a lower hierarchy path overhead and a pointer value.

When a difference between the write clock generated from the TX FIFO write clock generator 121 and the read clock generated from the TX FIFO read clock generator 122 is 1 byte, a bit stuffing controller 130 generates a control signal for constantly maintaining the clock difference. A pointer generator 160 generates an incremental or decremental pointer adjusting signal according to the control signal generated from the bit stuffing controller 130, and generates substantially 1-byte data by adjusting a pointer value. A lower level pointer includes V1, V2, V3 and V4 bytes. Theses bytes are positioned at the first byte of each part when equally dividing a TU-11 frame of 500 us by four. Therefore, each Vn byte appears by 1 every 500 us frame.

Figure 7:
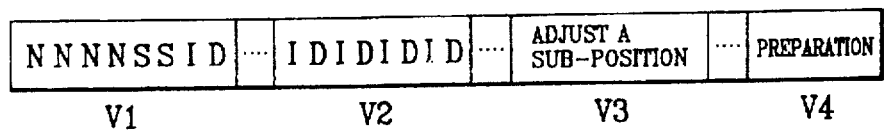
FIG. 7 illustrates a configuration of a pointer.

The pointer is constructed as shown in FIG. 7. The first four bits of the V1 and V2 bytes, indicated by four N's, designate a new data flag, and the next two bits indicated by two S's represent a data size. The last 10 bits alternatively interleaved by I and D bits indicate an address and show a start address of a corresponding VC frame and a state when it is adjusted. The V3 byte is used to adjust a sub-position. The V4 byte is for preparation.

Figure 6:
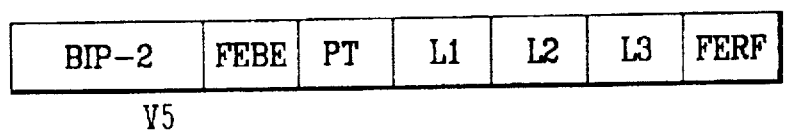
FIG. 6 illustrates a configuration of a lower hierarchy path overhead.

An overhead generator 150 generates an overhead for a lower hierarchy path of BIP (bit interleaved parity)-2 etc. and transmits the overhead inserted into a V5 byte of the VC-11 frame to a TU-11 frame former 140. As shown in FIG. 6, the V5 byte transmitting the lower hierarchy path overhead consists of a bit interleaved even number checking bit BIP-2, a far end block error indicating bit FEBE, a path tracking bit PT, a signal indicating bit Ln, a far end receive failure bit FERF, etc.

Figure 3:
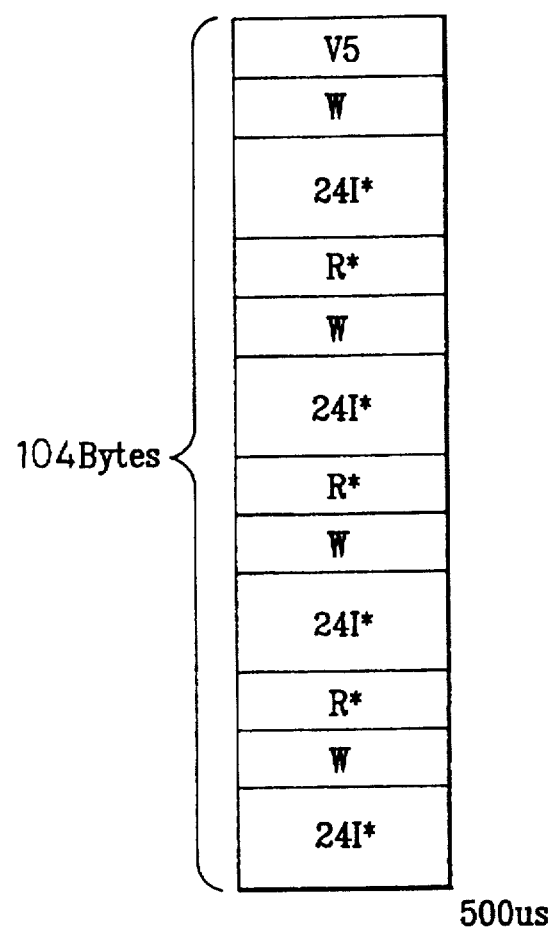
FIG. 3 illustrates mapping a DS-1 signal to a VC-11 signal.

Meanwhile, the VC-11 circuit maps the DS-1 signal transmitted from the FIFO buffer 120 to a VC-11 signal of 104 bytes consisting of a path overhead byte V5, four information bytes 24I*, four fixed bytes R* and information and fixed byte Wn, as shown in FIG. 3.

Figure 4:
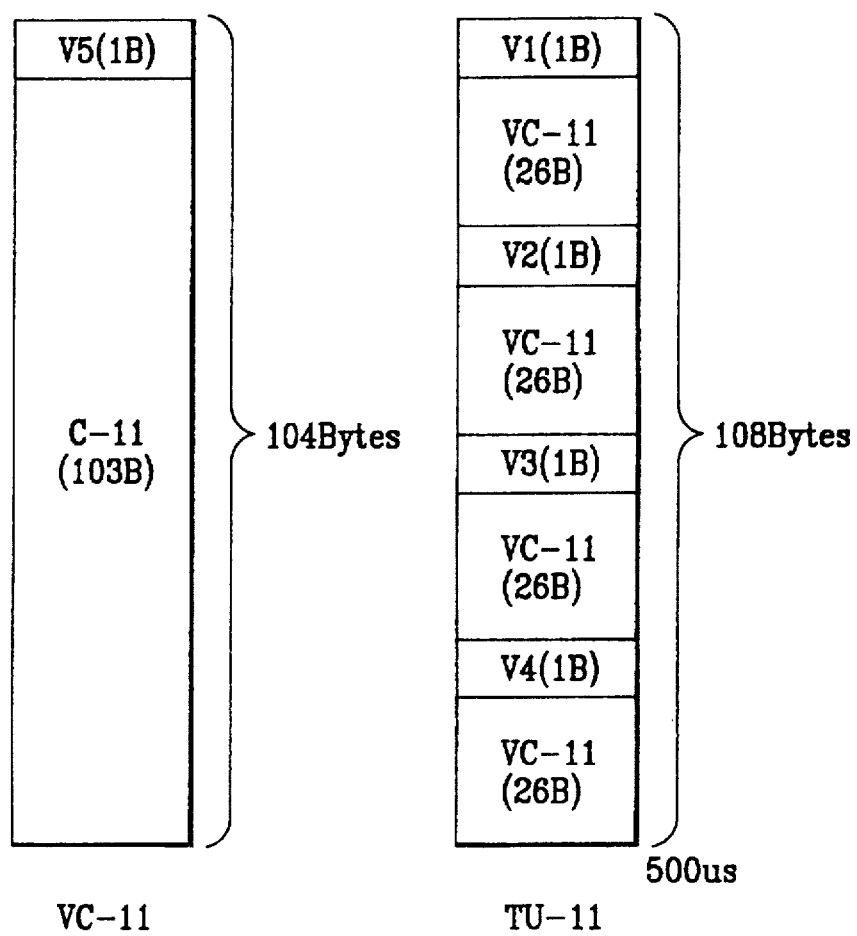
FIG. 4 illustrates aligning a VC-11 signal to a TU-11 signal.

The TU-11 frame former aligns the mapped VC-11 signal to a TU-11 signal. That is, four TU-11 frame formers 140-143 receive the DS-1 data generated from the TX FIFO buffer 120, the overhead generated from the overhead generator 150 and the pointer value generated from the pointer generator 160, and construct a perfect TU-11 frame. That is, as shown in FIG. 4, each TU-11 frame former, 140 for example, forms the VC-11 signal consisting of the path overhead byte V5 of one byte and C-11 of 103 bytes to the TU-11 frame of 108 bytes in which four pointer bytes V1-V4 are interleaved to four VC-11 signals each having 26 bytes. The four formed TU-11 frame data are multiplexed by a TUG-2 multiplexer 170 to 4:1, as shown in FIG. 5. The multiplexed data is supplied to an upper circuit. The four TU-11 data are sequentially interleaved one byte by one byte. The output data of the TUG-2 multiplexer 170 is transmitted to the upper circuit with a transmission speed of 6.912 Mbps.

The receiver 200 is opposite to the transmitter 100 in operation. A loopback controller 210 of the receiver 200 receives RX data of 6.912 Mbps at a normal mode. At a test mode, the TX data generated from the TUG-2 multiplexer 170 is fed back to the RX path 210 for judging an error of the circuit by checking whether the transmitting and RX data are equal. A TUG-2 demultiplexer 220 demultiplexes the data multiplexed to 4:1 to four independent data. Four TU-11 frame deformers 230-234 deform each frame for four data and extract transparent data, the path overhead and the pointer value. The transparent data indicates data in which the path overhead and the pointer value are eliminated, and represents non-modulated data. The transparent data out of the output data of the TU-11 frame deformer 230, for example, is supplied to the RX FIFO buffer 260. The path overhead for a lower hierarchy path of BIP-2 etc. is interpreted by an overhead processor 240 to implement each unique function. A pointer processor 250 receiving the point value interprets the pointer value and judges the state of the point. The pointer processor 250 generates a control signal according to a judged result.

An RX clock generator 270 generates various clocks necessary for the operation of the receiver 200 by using an RX clock of 6.912 MHz and a receiving frame clock of 2 KHz. An RX FIFO write clock generator 261 supplies a write clock to the RX FIFO buffer 260 according to control signals of the overhead processor 240 and the pointer processor 250 by using a 1.728 MHz clock generated from the RX clock generator 270. The RX FIFO buffer 260 functioning as a data buffer is needed when the VC-11 frame and the DS-1 frame differ from each other in structure and when the pointer is adjusted. The clock comparator 280 monitors the write clock and the read clock and maintains a clock difference at a constant level. If there is a clock difference, the clock comparator 280 generates a bit leaking request signal. When the bit leaking request signal is generated from the clock comparator 280, the BL processor 290 processes bit leaking for a 6.912 MHz input clock generated from the DS-1 network and generates a 6.176 MHz clock. Moreover, the BL processor 290 divides the 6.176 MHz clock by a factor of four and generates a 1.544 MHz clock.

An RX FIFO read clock generator 262 reads data from the RX FIFO buffer 260 by using the 1.544 MHz clock generated from the BL processor 290 as the read clock. The read clock and the write clock of the RX FIFO buffer 260 are not equal. When the pointer adjusting signal is generated, there is a severe clock difference of one byte. Therefore, the clock comparator 280 monitors the write clock and the read clock in order to constantly maintain the clock difference. A B8ZS coder 295 codes the TU-11 signal which is the system signal of 1.728 Mbps supplied to the RX FIFO buffer 260 to a B8ZS code, and transmits the B8ZS coded signal with a speed of 1.544 Mbps.

As described above, the inventive apparatus accommodates the ITU-T recommendation associated with the synchronous multiplexing structure and implements the function of VC-11 and TUG-2. By using a TX and RX data buffer in the transmitter and the receiver respectively, a circuit configuration is simplified and the area of a chip is reduced. Further, the present invention has a wide application to the development of an ASIC (Application Specific Integrated Circuit) for SDH.

It will be apparent to those skilled in the art that various modifications and variations can be made in the apparatus of the present invention without departing from the spirit or scope of the invention. Thus, it is intended that the present invention cover the modifications and variations of this invention provided they come within the scope of the appended claims and their equivalents.

What is claimed is:

1. An apparatus for implementing an integrated function of Virtual Container-11 (VC-11) and Tributary Unit Group-2 (TUG-2) in a synchronous multiplexing structure for synchronizing a DS-1 network signal and a TUG-2 system signal and transmitting the synchronized signal, said apparatus comprising:

a B8ZS decoder for decoding a DS-1 network transmitting signal of 1.544 Mbps coded to a B8ZS code to network data;

a transmitting signal write clock generator for generating a write clock used for writing the network data decoded from said decoder;

a transmitting signal read clock generator for receiving a transmitting clock, and for generating a read clock used for reading the network data decoded from said decoder;

transmitting data storing means for writing the DS-1 network data decoded from said decoder in synchronization with said write clock, and for generating the DS-1 network data of a Tributary Unit-11 (TU-11) frame structure of 1.728 Mbps including spaces for a path overhead and a pointer in synchronization with said read clock;

a bit stuffing controller for generating a control signal for constantly maintaining a difference between said write and read clocks of said transmitting data storing means;

a pointer generator for substantially generating one-byte data by adjusting a pointer value by utilizing a pointer adjusting signal when the difference between said read and write clocks is one-byte;

an overhead generator for generating an overhead bit for a lower hierarchy path;

frame formers for receiving the DS-1 network data generated from said transmitting data storing means, the overhead generated from said overhead generator and the pointer value generated from said pointer generator, and for forming TU-11 frame data;

a transmitting clock generator for receiving a transmitting clock of 6.912 MHz, for transmitting a clock needed to read data to said transmitting signal read clock generator, and for generating a frame transmitting clock of 2 KHz; and a TUG-2 multiplexer for multiplexing the TU-11 frame data formed form said TU-11 frame formers, and for transmitting the multiplexed data with a speed of 6.912 Mbps.

2. The apparatus as claimed in claim 1, wherein said transmitting data storing means uses a first-in first-out buffer.

3. The apparatus as claimed in claim 1, wherein said read clock and write clock supplied to said transmitting data storing means are different from each other.

4. An apparatus for implementing an integrated function of Virtual Container-11 (VC-11) and Tributary Unit Group-2 (TUG-2) in a synchronous multiplexing structure for synchronizing a network signal of DS-1 and a system signal of TUG-2 and receiving the synchronized signal, said apparatus comprising:

a loopback controller for receiving, in a normal mode, RX data of 6.912 Mbps, and for receiving, in a test mode, transmitting data as feedback to confirm whether the transmitting and RX data are equal;

a TUG-2 demultiplexer for demultiplexing multiplexed TUG-2 system frame data received through said loopback controller into independent data;

TU-11 frame deformers for deforming each frame of the independent demultiplexed data, and for extracting a path overhead, a pointer value, and a TU-11 signal in which the path overhead and the pointer value are eliminated;

a path overhead processor for interpreting the path overhead extracted by one of said TU-11 frame deformers, and for implementing each corresponding function thereof;

a pointer processor for interpreting the pointer value extracted by one of said TU-11 frame deformers, and for generating a control signal according to a judged result of the pointer value;

an RX clock generator for generating various clocks necessary for an operation of a receiver by using an RX clock of 6.912 MHz and a receiving frame clock of 2 KHz applied from without;

an RX data write clock generator for receiving the clock generated from said RX clock generator, and for generating a write clock used for writing TU-11 system data of 1.728 Mbps in which the path overhead and the pointer are eliminated according to control signals of said overhead processor and said pointer processor;

an RX data read clock generator for generating a read clock used for reading data from a clock obtained by dividing a bit leaked clock by a factor of four;

a clock comparator for comparing said write clock with said read clock to constantly maintain a clock difference, and for generating a bit leaking request signal when there is a clock difference;

a bit leaking processor for bit leaking a 6.912 MHz input clock by said bit leaking request signal generated from said clock comparator, and for dividing the bit leaked clock by a factor of four;

RX data storing means for storing the TU-11 data in which the path overhead and the pointer are eliminated in synchronization with said write clock, and for converting the stored TU-11 data to DS-1 data in synchronization with said read clock; and a B8ZS coder for coding the DS-1 data generated from said RX data storing means to a B8ZS code, and for transmitting the B8ZS coded signal with a speed of 1.544 Mbps.

5. The apparatus as claimed in claim 4, wherein said RX data storing means uses a first-in first-out buffer.

6. The apparatus as claimed in claim 4, wherein said read clock and write clock supplied to said RX data storing means are different from each other.

* * * * *